(12) United States Patent
Lee

(10) Patent No.: US 11,396,886 B2
(45) Date of Patent: Jul. 26, 2022

(54) CASING FOR PREVENTING DISTORTION AND PUMP INCLUDING THE SAME

(71) Applicant: Sang Seon Lee, Wonju-si (KR)

(72) Inventor: Sang Seon Lee, Wonju-si (KR)

(*) Notice: Subject to any disclaimer, the term of this patent is extended or adjusted under 35 U.S.C. 154(b) by 330 days.

(21) Appl. No.: 16/747,705

(22) Filed: Jan. 21, 2020

(65) Prior Publication Data

US 2020/0240432 A1 Jul. 30, 2020

Related U.S. Application Data

(63) Continuation of application No. PCT/KR2020/000208, filed on Jan. 6, 2020.

(30) Foreign Application Priority Data

Jan. 25, 2019 (KR) .................. 10-2019-0010045
Jan. 3, 2020 (KR) .................. 10-2020-0000733

(51) Int. Cl.
*F04D 29/40* (2006.01)
*B29C 70/68* (2006.01)
*B29L 31/00* (2006.01)
*B29K 705/00* (2006.01)

(52) U.S. Cl.
CPC .............. *F04D 29/40* (2013.01); *B29C 70/68* (2013.01); *B29K 2705/00* (2013.01); *B29L 2031/7496* (2013.01)

(58) Field of Classification Search
CPC ...... F04D 29/02; F04D 29/026; F04D 29/426; F04D 29/4286
See application file for complete search history.

(56) References Cited

U.S. PATENT DOCUMENTS

| | | | | |
|---|---|---|---|---|
| 2,246,859 | A * | 6/1941 | Pierce ................. | A47L 5/30 415/206 |
| 2002/0070062 | A1 * | 6/2002 | Joutaki ............... | B62D 29/004 180/68.4 |
| 2013/0115053 | A1 * | 5/2013 | Chien .................. | F04D 29/061 415/122.1 |

FOREIGN PATENT DOCUMENTS

| | | | |
|---|---|---|---|
| JP | 06299991 | A | 10/1994 |
| JP | 08219355 | A | 8/1996 |
| KR | 19800001300 | B1 | 8/1980 |
| KR | 2019860000610 | B1 | 12/1985 |
| KR | 1020140089704 | A | 7/2014 |
| KR | 1020140089704 | A | 8/2014 |
| KR | 1020180010041 | A | 1/2018 |
| KR | 1020180010041 | A | 9/2018 |

* cited by examiner

*Primary Examiner* — J. Todd Newton
*Assistant Examiner* — Brian O Peters

(57) ABSTRACT

Various pumps capable of preventing distortion are disclosed. A casing of the pump comprises a metal member configured to have at least two sub metal members and a body. Here, the sub metal members are included in the body, and the body is formed of plastic.

8 Claims, 7 Drawing Sheets

CASING FOR PREVENTING DISTORTION AND PUMP INCLUDING THE SAME

CROSS-REFERENCE TO RELATED APPLICATIONS

This application is a continuation application of a PCT application filed on Jan. 6, 2020 and assigned Serial No. PCT/KR2020/000208, and which claims priority from Korean Patent Application No. 10-2019-0010045 filed with the Korean Intellectual Property Office on Jan. 25, 2019, Korean Patent Application No. 10-2020-0000733 filed with the Korean Intellectual Property Office on Jan. 3, 2020. The entire disclosure of above patent applications is incorporated herein by reference.

TECHNICAL FIELD

The present disclosure relates to various casings for preventing distortion and a pump including the same.

BACKGROUND ART

Conventional casing of a pump is formed of a metal. As a result, it is difficult to process the casing and manufacturing cost of the pump is very expensive.

SUMMARY

To solve problem of the conventional technique, the disclosure is to provide various casings capable of preventing distortion and a pump including the same.

A casing of a pump according to an embodiment of the disclosure includes a metal member configured to have at least two sub metal members; and a body. Here, the sub metal members are included in the body, and the body is formed of plastic.

A casing of a pump according to another embodiment of the disclosure includes a metal member; and a body formed of plastic. Here, at least one hole in which melted plastic is filled when an insert molding is performed is formed on the metal member, and the metal member is included in the body through the insert molding.

A method of manufacturing a casing of a pump according to an embodiment of the disclosure includes surrounding an integral liner with sub metal members; and inserting a structure where the sub metal members surround the liner in melted plastic, so that the sub metal members are included in a body formed of plastic.

In a casing of a pump of the disclosure, a metal member is included in a body formed of plastic. Accordingly, distortion may not be occurred to the casing when the casing is combined with a piping.

Additionally, the casing of the disclosure is very excellent compared to a casing of a pump formed of plastic, in view of strength.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The disclosure relates to a pump. In a casing of the pump, a metal member is included in a body formed of plastic. As a result, distortion of the casing may be prevented when the pump is combined with a piping.

A body of a casing of conventional pump is wholly formed of a metal. As a result, strength of the casing is excellent and distortion of the casing is prevented. However, it is difficult to process the casing to have desired shape and manufacturing cost of the pump is very expensive.

If the body is formed of only plastic, it is easy to process the casing and manufacturing cost of the casing is low. However, distortion may occur to the casing when the pump is combined with a piping, and so the casing may be broken down.

Accordingly, the disclosure provides various pumps including a casing capable of preventing distortion with easy processing and low manufacturing cost.

Hereinafter, various embodiments of the disclosure will be described in detail with reference to accompanying drawings.

Figure 1:
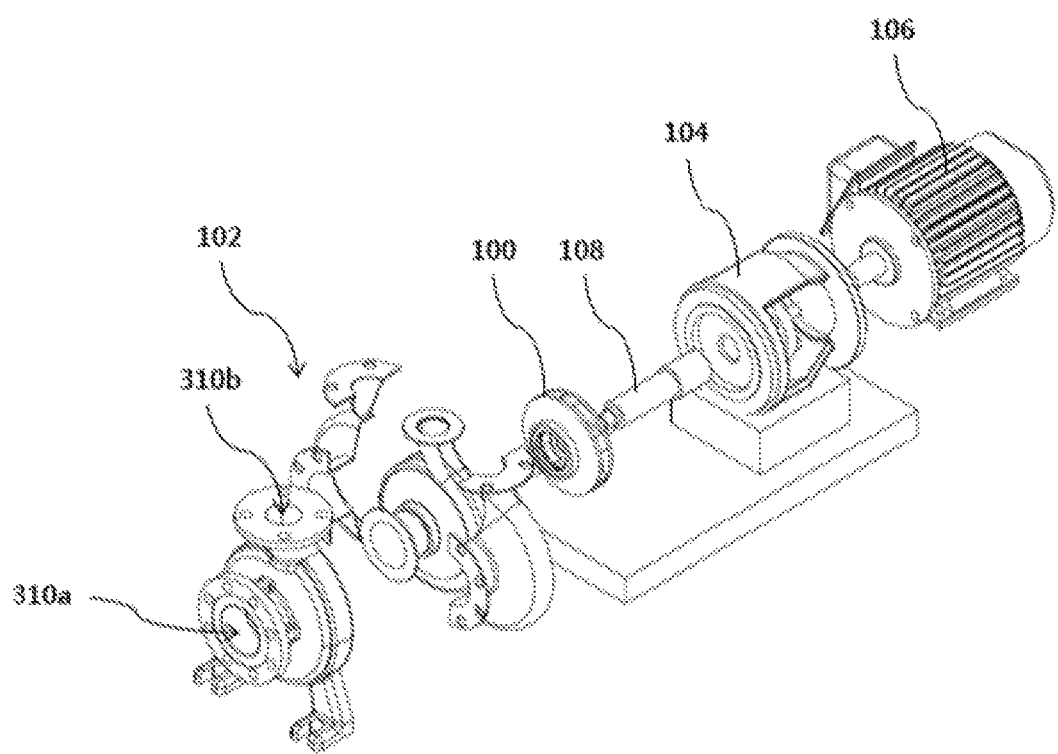
FIG. 1 is a perspective view illustrating decomposition structure of a pump according to an embodiment of the disclosure.
Figure 2:
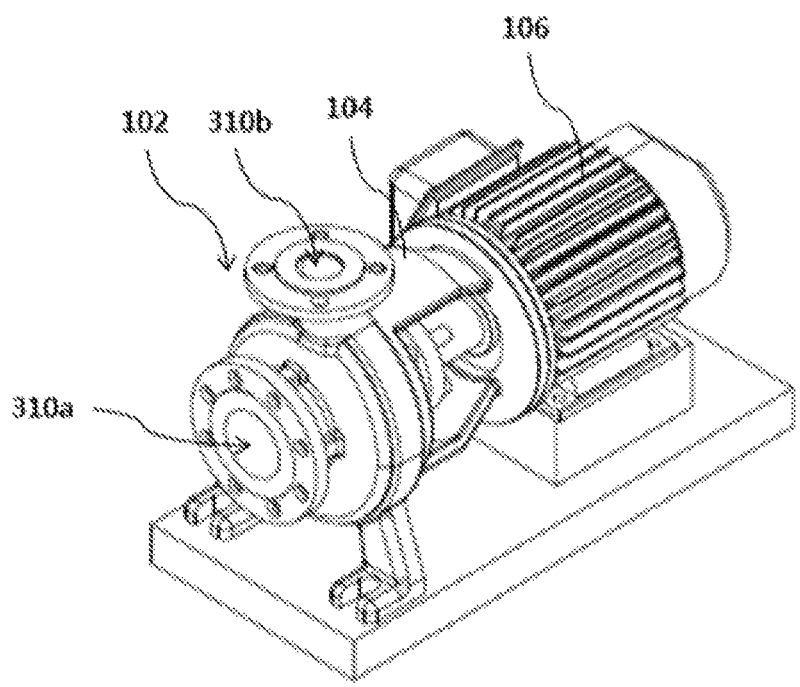
FIG. 2 is a perspective view illustrating a pump according to an embodiment of the disclosure.
Figure 3:
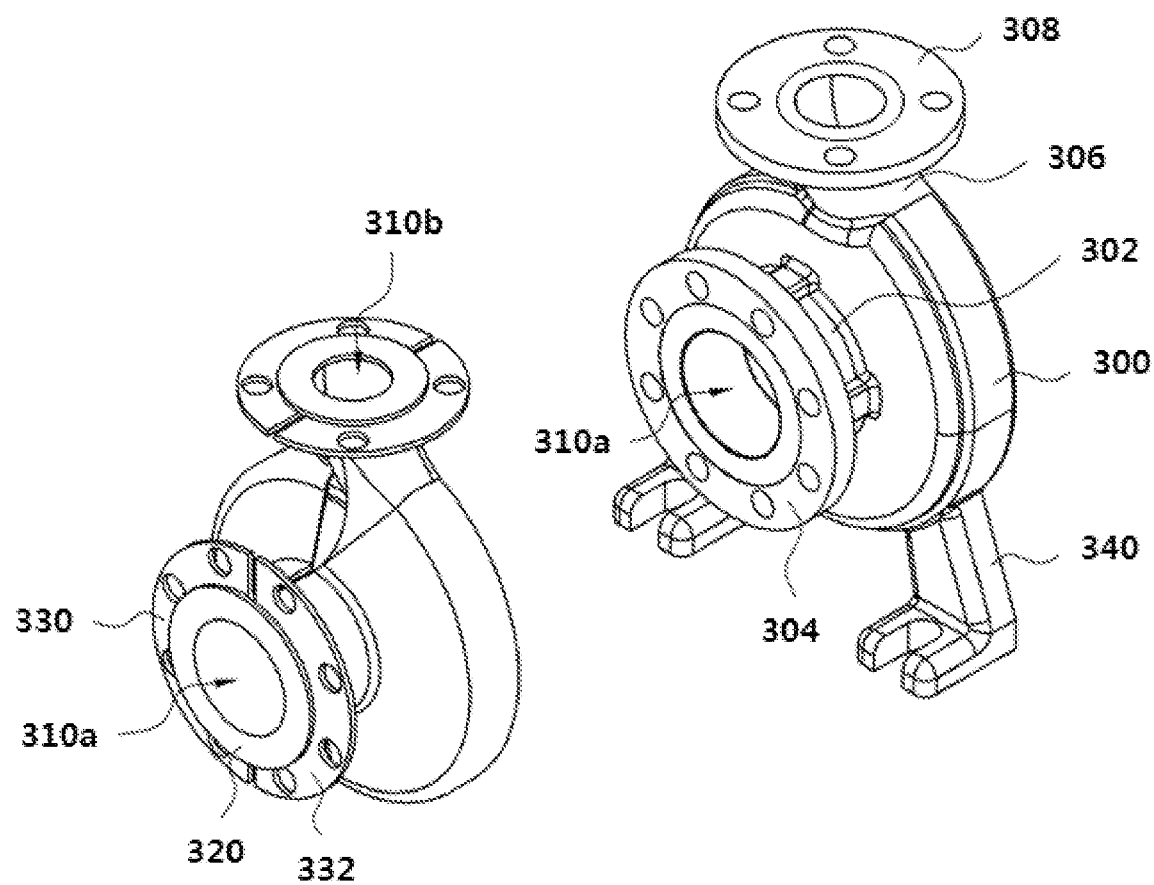
FIG. 3 is a view illustrating decomposition structure of a casing according to an embodiment of the disclosure.
Figure 4:
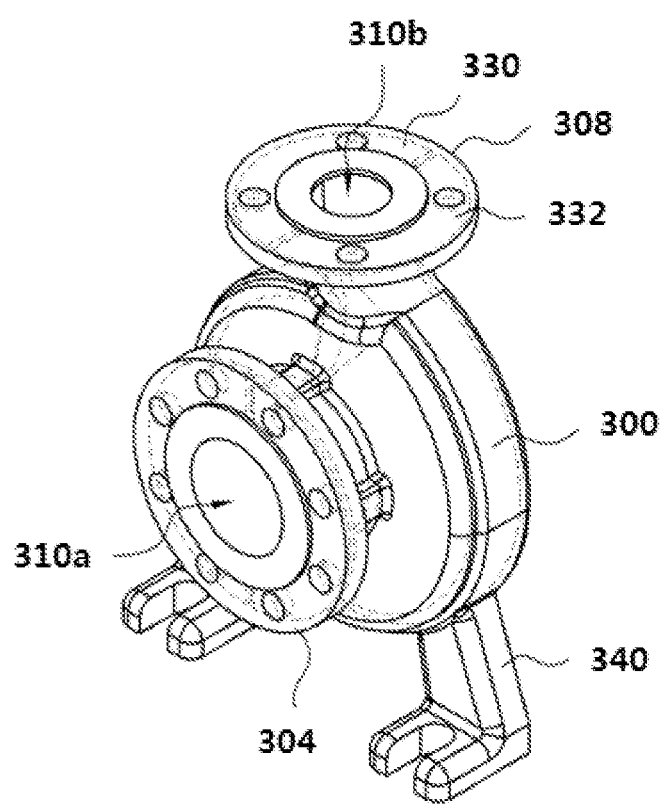
FIG. 4 is a perspective view illustrating a casing according to an embodiment of the disclosure.
Figure 5:
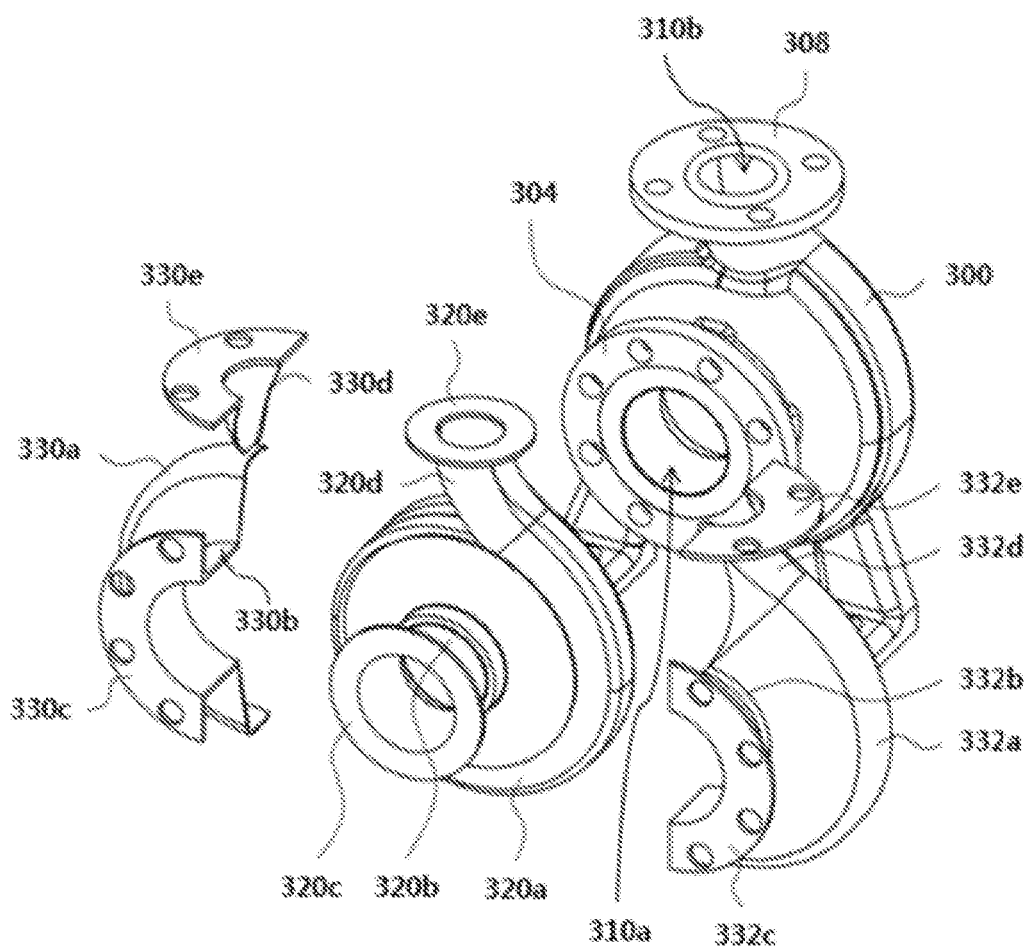
FIG. 5 is a perspective view illustrating decomposition structure of a liner and a metal member.
Figure 6:
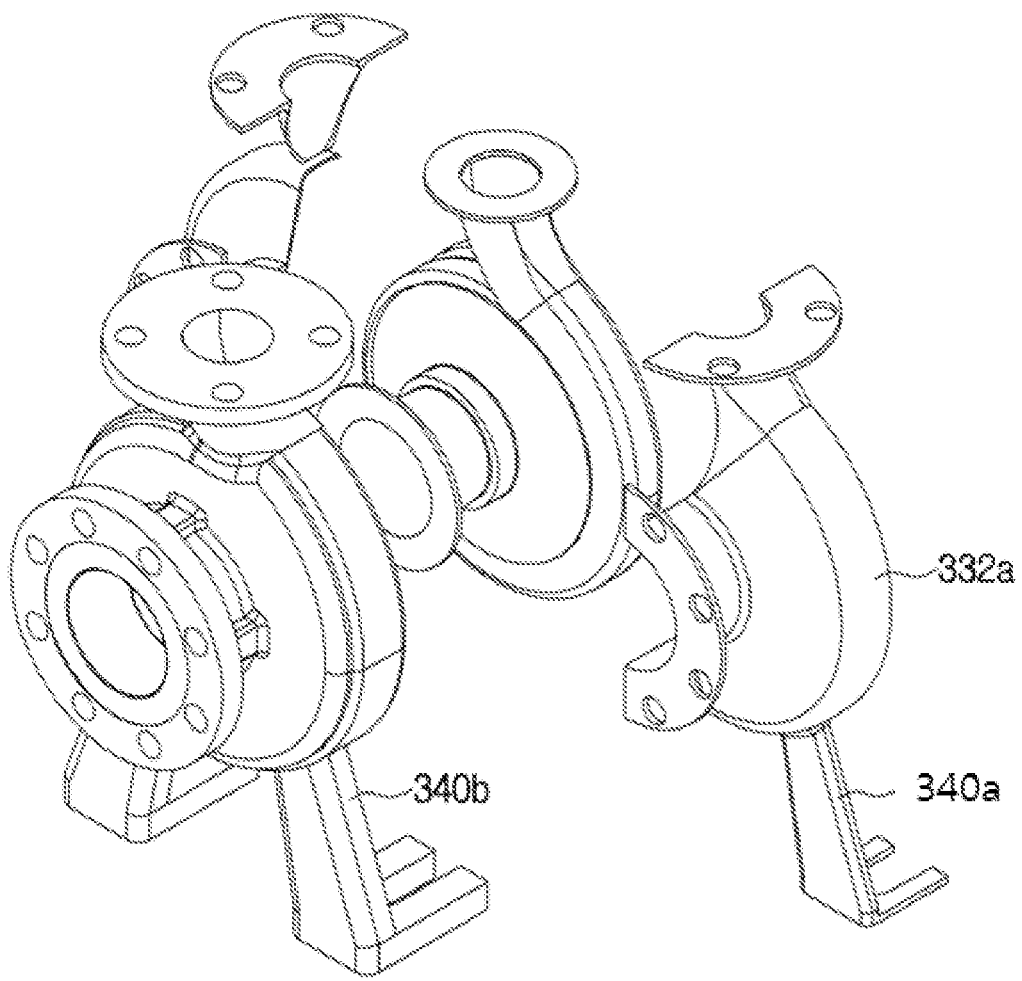
FIG. 6 is a view illustrating decomposition structure of a casing of a pump according to an embodiment of the disclosure.

FIG. 1 is a perspective view illustrating decomposition structure of a pump according to an embodiment of the disclosure, and FIG. 2 is a perspective view illustrating a pump according to an embodiment of the disclosure. FIG. 3 is a view illustrating decomposition structure of a casing according to an embodiment of the disclosure, FIG. 4 is a perspective view illustrating a casing according to an embodiment of the disclosure, FIG. 5 is a perspective view illustrating decomposition structure of a liner and a metal member, and FIG. 6 is a view illustrating decomposition structure of a casing of a pump according to an embodiment of the disclosure. A left structure in FIG. 3 shows combination structure of the liner and the metal member, and a right structure in FIG. 3 illustrates composition structure of a body, the liner and the metal member. A front structure in FIG. 5 shows decomposition structure of the liner and the metal member, and a rear structure in FIG. 5 illustrates composition structure of the body, the liner and the metal member.

In FIG. 1 and FIG. 2, a pump of the present embodiment may include an impeller 100, a casing 102, a seal member 104, a motor 106 and a shaft 108.

The impeller 100 may deliver fluid inputted to a first fluid flow space 310a through a piping such as a pipe, etc. to a second fluid flow space 310b. Particularly, the impeller 100 may rotate in a specific velocity and deliver the fluid inputted to the first fluid flow space 310a up to a specific height of the second fluid flow space 310b in response to the rotating. Here, the specific height may depend on a rotation velocity of the impeller 100.

The casing 102 protects the impeller 100 and may include the first fluid flow space 310a to which the fluid is inputted and the second fluid flow space 310b for delivering the fluid transferred through the first fluid flow space 310a to another piping. Here, the first fluid flow space 310a may cross over the second fluid flow space 310b.

In an embodiment, in the casing 102, a metal member may be included in a plastic member. This will be described below.

The seal member 104 prevents the fluid transferred through the first fluid flow space 310a from being out flowed. Structure of the seal member 104 is not limited as in FIG. 1 but is variously modified as long as the seal member 104 prevents out flowing of the fluid.

The motor 106 rotates the impeller 100. Particularly, an axis of the motor 106 is connected to a shaft 108, and the shaft 108 is combined with the impeller 100. As a result, the shaft 108 rotates when the axis of the motor 106 rotates, and the impeller 100 rotates in response to rotating of the shaft 108.

Hereinafter, the casing 102 will be described in detail.

In FIG. 3 to FIG. 5, the casing 102 of the pump of the present embodiment may include a body, a liner 320, a metal member having a first sub metal member 330 and a second sub metal member 332 and a supporting member 340.

The body may include a body member 300, a first body connection member 302, a first body flange member 304, a second body connection member 306 and a second body flange member 308, and it may be in a body.

In an embodiment, the body may be formed of a super engineering plastic or an engineering plastic. For example, the body may be made up of a polyphenylene ethers resin composition including a polyphenylene ethers resin and a polystyrene resin. Of course, the body may be formed of a polypropylene, a polyimide, a polysulfone, a poly phenylene sulfide, a polyamide imide, a polyacrylate, a polyether sulfone, a polyether ether ketone, a polyether imide, a liquid crystal polyester, a polyether ketone, etc. and their combination.

The body member 300 has for example a circular shape, but shape of the body member 300 is not limited as the circular shape.

The first body flange member 304 is connected to one end part of the body member 300 through the first body connection member 302 and may be combined with a flange of a piping.

In an embodiment, at least one hole may be formed on a first body flange member 304, a hole may be formed on the flange of the piping, and the first body flange member 304 may be combined with the flange of the piping by passing a fixing member such as a bolt, etc. through the hole of the first body flange member 304 and the hole of the flange of the piping. As a result, the pump may be combined with the piping.

On the other hand, the pump may be combined with every device having a flange, and a combination process may be similar to above combination process.

The second body flange member 308 may be connected to the other end part of the body member 300 through the second body connection member 306 and be combined with a piping. The combination process is similar to the combination process of the first body flange member 304.

The liner 320 is formed in the body and has the same shape as the body or has a shape similar to the body.

In an embodiment, the liner 320 may be formed of a fluorine resin. The fluorine resin means every resin including fluorine in a molecule, and it includes a Polytetrafluoroethylene, PTFE, a Polychlorotrifluoroethylene PCTFE, a PolyVinyliDene Fluoride PVDF, a Fluorinated ethylene propylene FEP, an Ethyl Tetra Fluoro Ethylene ETFE or a Perfluoroalkoxy alkane PFA, etc. This fluorine resin has excellent heat resistance, excellent chemical resistance, excellent electric insulation, small friction coefficient, and does not have adhesion.

The liner 320 may be in a body and it may include a liner body member 320a, a first liner connection member 320b, a first liner flange member 320c, a second liner connection member 320d and a second liner flange member 320e.

In an embodiment, the first fluid flow space 310a through which the fluid flows may be formed in the first liner flange member 320c, the first liner connection member 320b and the liner body member 320a, and the second fluid flow space 310b may be formed in the second liner flange member 320e, the second liner connection member 320d and the liner body member 320a. That is, the fluid flow space 310 may include the first fluid flow space 310a and the second fluid flow space 310b. Accordingly, the fluid inputted to the first fluid flow space 310a may be outputted through the second fluid flow space 310b.

The first liner flange member 320c may be disposed in the first body flange member 304, and one side of the first liner flange member 320c may be exposed outside.

The second liner flange member 320e may be disposed in the second body flange member 308, and one side of the second liner flange member 320e may be exposed outside.

The metal member may surround the liner 320 and be included in the body, as shown in FIG. 3 and FIG. 5. Here, whole of the metal member is included in the body, and none part of the metal member may be exposed outside. That is, the liner 320 locates in the metal member, and the whole of the metal member may be included in the body.

In an embodiment, the metal member may include a first sub metal member 330 and a second sub metal member 332. For example, the metal member may include two sub metal members 330 and 332 with different shape. Here, the sub metal members 330 and 332 may be independent members.

The first sub metal member 330 may be in integral type, cover a part of the liner 320, and include a first sub metal body member 330a, a 1-1 sub metal connection member 330b, a 1-1 sub metal flange member 330c, a 1-2 sub metal connection member 330d and a 1-2 sub metal flange member 330e.

The first sub metal body member 330a may surround a part of the liner body member 320a and have a curved shape.

The 1-1 sub metal flange member 330c may be connected to an end part of the first sub metal body member 330a through the 1-1 sub metal connection member 330b and close to the first liner flange member 320c while it is disposed just beneath the first liner flange member 320c. Particularly, a groove curve line formed at a center of the 1-1 sub metal flange member 330c may surround a part of the first liner connection member 320b just beneath the first liner flange member 320c, curvature of the groove curve line being the same as or similar to that of the first liner connection member 320b.

In an embodiment, a width of the 1-1 sub metal flange member 330c is higher than that of the first liner flange member 320c. As a result, at least part of the 1-1 sub metal flange member 330c may be projected outside the first liner flange member 320c in a width direction when the 1-1 sub metal flange member 330c surrounds the first liner connection member 320b, as shown in FIG. 3. Here, the first liner flange member 320c may be projected compared to the 1-1 sub metal flange member 330c in a longitudinal direction.

On the other hand, the 1-1 sub metal flange member 330c might surround directly the first liner flange member 320c. In this case, the pump may have unstable structure because a space exists between the liner 320 and the metal member. Accordingly, it is effective that the 1-1 sub metal flange member 330c surrounds the first liner connection member 320b just beneath the first liner flange member 320c while the 1-1 sub metal flange member 330c closes to the first liner flange member 320c.

At least one hole may be formed on the 1-1 sub metal flange member 330c, a fixing member passing through the hole. That is, the fixing member passes the hole of the first body flange member 304 and the hole of the 1-1 sub metal flange member 330c when the pump is combined with the piping.

The 1-2 sub metal flange member 330e may be connected to the other end part of the first sub metal body member 330a through the 1-2 sub metal connection member 330d and close to the second liner flange member 320e while it is disposed just beneath the second liner flange member 320e. Particularly, a groove curve line formed at a center of the 1-2 sub metal flange member 330e may surround a part of the second liner connection member 320d just beneath the second liner flange member 320e, curvature of the groove curve line being the same as or similar to that of the second liner connection member 320d.

In an embodiment, a width of the 1-2 sub metal flange member 330e is higher than that of the second liner flange member 320e. As a result, at least part of the 1-2 sub metal flange member 330e may be projected outside the second liner flange member 320e in a width direction when the 1-2 sub metal flange member 330e surrounds the second liner connection member 320d, as shown in FIG. 3. Here, the second liner flange member 320e may be projected compared to the 1-2 sub metal flange member 330e in a longitudinal direction.

On the other hand, the 1-2 sub metal flange member 330e might surround directly the second liner flange member 320e. In this case, the pump may have unstable structure because a space exists between the liner 320 and the metal member. Accordingly, it is effective that the 1-2 sub metal flange member 330e surrounds the second liner connection member 320d just beneath the second liner flange member 320e while the 1-2 sub metal flange member 330e closes to the second liner flange member 320e.

At least one hole may be formed on the 1-2 sub metal flange member 330e, a fixing member passing through the hole. That is, the fixing member passes the hole of the second body flange member 308 and the hole of the 1-2 sub metal flange member 330e when the pump is combined with the piping.

On the other hand, the 2-1 sub metal flange member 332c may have a shape of doughnuts cut by half, end sections except the groove curve line may be contacted with end sections of the 1-1 sub metal flange member 330c. That is, the metal member may surround the liner 320 while the end sections of the 1-1 sub metal flange member 330c are contacted with the end sections of the 2-1 sub metal flange member 332c. Here, the 1-1 sub metal flange member 330c has also a shape of doughnuts cut by half.

The second sub metal member 332 may be in integral type, cover the other part of the liner 320, and include a second sub metal body member 332a, a 2-1 sub metal connection member 332b, a 2-1 sub metal flange member 332c, a 2-2 sub metal connection member 332d and a 2-2 sub metal flange member 332e.

In one embodiment, the first sub metal member 330 may surround a part of the liner 320, and the second sub metal member 332 may surround the other part of the liner 320. That is, the sub metal members 330 and 332 may surround whole of the liner 320.

The second sub metal body member 332a may surround the other part of the liner body member 320a and have a curved shape.

The 2-1 sub metal flange member 332c may be connected to an end part of the second sub metal body member 332a through the 2-1 sub metal connection member 332b and close to the first liner flange member 320c while it is disposed just beneath the first liner flange member 320c. Particularly, a groove curve line formed at a center of the 2-1 sub metal flange member 332c may surround a part of the first liner connection member 320b just beneath the first liner flange member 320c, curvature of the groove curve line being the same as or similar to that of the first liner connection member 320b.

In an embodiment, a width of the 2-1 sub metal flange member 332c is higher than that of the first liner flange member 320c. As a result, at least part of the 2-1 sub metal flange member 332c may be projected outside the first liner flange member 320c in a width direction when the 2-1 sub metal flange member 332c surrounds the first liner connection member 320b, as shown in FIG. 3. Here, the first liner flange member 320c may be projected compared to the 2-1 sub metal flange member 332c in a longitudinal direction.

On the other hand, the 2-1 sub metal flange member 332c might surround directly the first liner flange member 320c. In this case, the pump may have unstable structure because a space exists between the liner 320 and the metal member. Accordingly, it is effective that the 2-1 sub metal flange member 332c surrounds the first liner connection member 320b just beneath the first liner flange member 320c while the 2-1 sub metal flange member 332c closes to the first liner flange member 320c.

At least one hole may be formed on the 2-1 sub metal flange member 332c, a fixing member passing through the hole. That is, the fixing member passes the hole of the first body flange member 304 and the hole of the 2-1 sub metal flange member 332c when the pump is combined with the piping.

The 2-2 sub metal flange member 332e may be connected to the other end part of the second sub metal body member 332a through the 2-2 sub metal connection member 332d and close to the second liner flange member 320e while it is disposed just beneath the second liner flange member 320e. Particularly, a groove curve line formed at a center of the 2-2 sub metal flange member 332e may surround a part of the second liner connection member 320d just beneath the second liner flange member 320e, curvature of the groove curve line being the same as or similar to that of the second liner connection member 320d.

In an embodiment, a width of the 2-2 sub metal flange member 332e is higher than that of the second liner flange member 320e. As a result, at least part of the 2-2 sub metal flange member 332e may be projected outside the second liner flange member 320e in a width direction when the 2-2 sub metal flange member 332e surrounds the second liner connection member 320d, as shown in FIG. 3. Here, the second liner flange member 320e may be projected compared to the 2-2 sub metal flange member 332e in a longitudinal direction.

On the other hand, the 2-2 sub metal flange member 332e might surround directly the second liner flange member 320e. In this case, the pump may have unstable structure because a space exists between the liner 320 and the metal member. Accordingly, it is effective that the 2-2 sub metal flange member 332e surrounds the second liner connection member 320d just beneath the second liner flange member 320e while the 2-2 sub metal flange member 332e closes to the second liner flange member 320e.

At least one hole may be formed on the 2-2 sub metal flange member 332e, a fixing member passing through the hole. That is, the fixing member passes the hole of the second body flange member 308 and the hole of the 2-2 sub metal flange member 332e when the pump is combined with the piping.

On the other hand, the 2-2 sub metal flange member 332e may have a shape of doughnuts cut by half, end sections except the groove curve line may be contacted with end sections of the 1-2 sub metal flange member 330e. That is, the metal member may surround the liner 320 while the end sections of the 1-2 sub metal flange member 330e are contacted with the end sections of the 2-2 sub metal flange member 332e. Here, the 1-2 sub metal flange member 330e has also a shape of doughnuts cut by half.

In a manufacture process, the metal member may be formed in the body by using an insert molding. Particularly, the metal member may be included in the body and the liner 320 may be formed in the metal member by insert-molding a structure where the sub metal members 330 and 332 surround the liner 320 in a plastic which is material of the body.

At least one hole other than the hole for the fixing member may be formed on the flange members 330c, 330e, 332c, 332e of the metal member, so that the metal member is fixed in the body. In this case, melted plastic fills the hole in the insert molding, and thus the metal member may be strongly combined in the body. However, a permeate preventing member (not shown) may be inserted into the hole for the fixing member so that the melted plastic is not filled in the hole, and then the permeate preventing member may be removed after the insert molding is completed.

One or more projection members may be formed on the metal member to more strongly combine the metal member in the body.

To use two separated sub metal members 330 and 332 is for locating the liner 320 in the metal member. It is impossible to insert the liner 320 in the metal member because a width of the flange member 320c or 320e of the liner 320 is greater than an inner space of the metal member, if the metal member is in a body. Accordingly, two separated sub metal members 330 and 332 are used to locate the liner 320 including the flange member 320c or 320e or the body member 320a higher than the inner space of the metal member in the metal member.

The supporting member 340 may support the body.

In an embodiment, the supporting member 340 may be wholly formed of metal or plastic and be longitudinally extended from a lower part of the body member 300 to support the body. In this case, the supporting member 340 may be combined with the body after it is independently manufactured.

In another embodiment, the supporting member 340 may include a metal supporting member 340a and a plastic supporting member 340b as shown in FIG. 6.

The metal supporting member 340a may be longitudinally extended from a lower part of the sub metal member and be formed in a body with the sub metal member.

The plastic supporting member 340b may surround the metal supporting member 340a and be formed together with the metal supporting member 340a when the insert molding is performed. Here, plastic of the plastic supporting member 340b may be formed of above material.

Accordingly, a process of forming the supporting member 340 is simple, and the supporting member 340 may support the casing with adequate force.

Shortly, the sub metal members 330 and 332 may be included in the body formed of the plastic through the insert molding, while two sub metal members 330 and 332 surround the liner 320. Here, the liner 320 may locate in the metal member.

Distortion may occur to the casing in a direction opposed to a fixed direction due to a fixing force of a fixing member when the flange of the casing is combined with a flange of the piping through the fixing member, if the body formed of plastic surrounds directly a liner and the metal member does not surround the liner.

Distortion may not occur or be minimized to the casing because the flange is strengthened though the flange of casing is combined with the flange of a piping through the fixing member, when the metal member is included in the body formed of the plastic while the liner 320 is disposed in the metal member.

Of course, distortion may be prevented when the casing is combined with the piping, if the body is formed of metal and the liner is included in the body. However, it is difficult to process the body and manufacturing cost of the casing may increase sharply. Additionally, corrosion may occur to the casing and lifetime of the casing may get shorter.

Accordingly, the body in the casing of the disclosure is formed of the plastic, wherein the metal member locates in the body to reinforce strength.

It is difficult to process precisely the metal member and it is easy to process precisely the plastic. The casing may have desired shape though the plastic is precisely processed without processing precisely the metal member, when the casing is manufactured. That is, the casing may be easily embodied to have desired shape with low manufacturing cost, and distortion may be minimized when the casing is combined with the piping On the other hand, the flange member of the liner 320, the flange member of the metal member and the flange member of the body form a flange. In view of the flange, a metal member is included in a plastic. As a result, distortion may be minimized though the flange of the pump is combined with the flange of the piping.

In the above description, the metal member comprises two sub metal members 330 and 332. However, the metal member may be formed with three or more sub metal members. Here, the liner 320 may be disposed in the sub metal members and the sub metal members may be included in the body. The sub metal members may have the same shape or at least one of the sub metal members may have different shape.

For example, three sub metal members, which are separately disposed by 120° with the same shape, may surround the liner 320. It is efficient that the metal member includes two sub metal members 330 and 332 in consideration of easiness of the process.

In an embodiment, the casing may not include the liner. That is, the casing may include a body and a metal member having a first sub metal member and a second metal member, without the liner.

Figure 7:
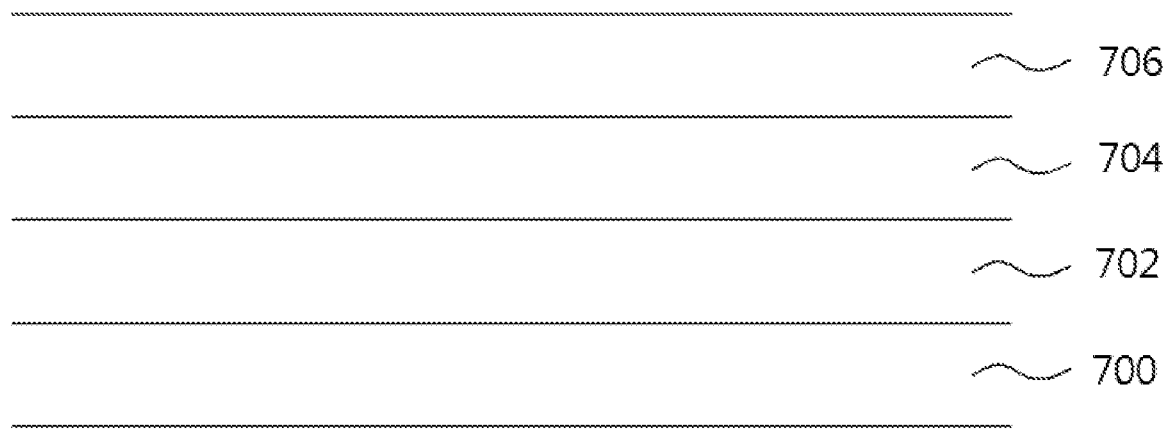
FIG. 7 is a view illustrating schematically section of a casing of a pump according to still another embodiment of the disclosure.

FIG. 7 is a view illustrating schematically section of a casing of a pump according to still another embodiment of the disclosure.

In FIG. 7, a liner 700, a resin layer 702, a metal member 704 and a body 706 may be sequentially disposed.

That is, unlike other embodiments, in the present embodiment, the resin layer 702 may be disposed between the liner 700 and the metal member 704.

In an embodiment, the resin layer 702 may be formed of the same material as the body 706. The material of the body in the above embodiment may be used as the material of the body 706.

If molding after inserting a structure where the sub metal members surround the liner 700 in a plastic corresponding to the material of the body 706 and the resin layer 702, melted plastic permeates through a space between the liner 700 and the metal member 704 because a space exists between the sub metal members. As a result, the resin layer 702 may be formed between the liner 700 and the metal member 704.

A hole may be formed on a part of the metal member 704 so that the melted plastic is easily permeated between the liner 700 and the metal member 704.

The structure where the resin layer is formed between the liner and the metal member may be also applied to other embodiments.

Hereinafter, material of the body will be described in detail.

The body may be formed by mixing a glass fiber with a Polyvinyl Chloride PVC, a polypropylene PP, a Poly Phenylene sulfide PPS, a Polyphthalamide PPA, a Polyamide PA6, a Polyamide PA66, a Polyketone POK or a Polyethylene PE. As a result, strength, impact resistance and mechanical feature of the body may be enhanced.

In another embodiment, the body may be formed by mixing a glass fiber and a carbon fiber with for example, a PVC, a PP, a PPS, a PPA, a PA6, a PA66, a POK or a PE. Accordingly, strength, impact resistance and mechanical feature of the body may be enhanced.

In still another embodiment, the body may be formed by mixing a glass fiber, a carbon fiber and a graphite fiber with for example, a PVC, a PP, a PPS, a PPA, a PA6, a PA66, a POK or a PE. Here, composition of the glass fiber, the carbon fiber and graphite fiber may be 20:10:5. As a result, strength, impact resistance and mechanical feature of the body may be enhanced.

Hereinafter, composition and an experimental result of the body will be described.

In an embodiment, the body may be formed by mixing a PP with a glass fiber. Preferably, the glass fiber has a weight percent higher than 0 weight percent and less than 40 weight percent, and the PP has a weight percent higher than 60 weight percent. Experimental result is shown in following table 1.

TABLE 1

| embodiment | glass fiber weight percent | Tensile strength(Mpa@23° C.) [ASTM D638] |
|---|---|---|
| comparison | 0 | 25 |
| 1 | 10 | 54 |
| 2 | 15 | 59 |
| 3 | 20 | 78 |
| 4 | 30 | 83 |
| 5 | 40 | 94 |

It is verified through the above table 1 that tensile strength of the body when the body is formed by mixing the PP with the glass fiber is very greater than that of a body formed of only the PP. That is, mechanical property and chemical property may be enhanced. However, it is difficult to manufacture the body to have desired shape because an insert molding feature for manufacturing the body is deteriorated when the glass fiber has a weight percent higher than 40 weight percent.

In an embodiment, the body may be formed by mixing a PPS with a glass fiber. Preferably, the glass fiber has a weight percent higher than 0 weight percent and less than 40 weight percent, and the PPS has a weight percent higher than 60 weight percent. Experimental result is shown in following table 2.

TABLE 2

| embodiment | glass fiber weight percent | Tensile strength(Mpa@23° C.) [ASTM D638] |
|---|---|---|
| comparison | 0 | 70 |
| 1 | 30 | 140 |
| 2 | 40 | 200 |

It is verified through the above table 2 that tensile strength of the body when the body is formed by mixing the PPS with the glass fiber is very greater than that of a body formed of only the PPS. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 40 weight percent.

In still another embodiment, the body may be formed by mixing a PPA with a glass fiber. Preferably, the glass fiber has a weight percent higher than 0 weight percent and less than 55 weight percent, and the PPA has a weight percent higher than 45 weight percent. Experimental result is shown in following table 3.

TABLE 3

| embodiment | glass fiber weight percent | Tensile strength(Mpa@23° C.) [ASTM D638] |
|---|---|---|
| comparison | 0 | 105 |
| 1 | 25 | 170 |
| 2 | 35 | 210 |
| 3 | 45 | 250 |
| 4 | 55 | 270 |

It is verified through the above table 3 that tensile strength of the body when the body is formed by mixing the PPA with the glass fiber is very greater than that of a body formed of only the PPA. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 55 weight percent.

In still another embodiment, the body may be formed by mixing a PA6 with a glass fiber. Preferably, the glass fiber has a weight percent higher than 0 weight percent and less than 50 weight percent, and the PA6 has a weight percent higher than 50 weight percent. Experimental result is shown in following table 4.

TABLE 4

| embodiment | glass fiber weight percent | Tensile strength(Mpa@23° C.) [ASTM D638] |
|---|---|---|
| comparison | 0 | 70 |
| 1 | 15 | 125 |
| 2 | 20 | 145 |
| 3 | 30 | 170 |
| 4 | 33 | 180 |
| 5 | 35 | 185 |
| 6 | 40 | 192 |
| 7 | 45 | 200 |
| 8 | 50 | 220 |

It is verified through the above table 4 that tensile strength of the body when the body is formed by mixing the PA6 with the glass fiber is very greater than that of a body formed of only the PA6. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 50 weight percent.

In still another embodiment, the body may be formed by mixing a PA66 with a glass fiber. Preferably, the glass fiber has a weight percent higher than 0 weight percent and less than 50 weight percent, and the PA66 has a weight percent higher than 50 weight percent. Experimental result is shown in following table 5.

TABLE 5

| embodiment | glass fiber weight percent | Tensile strength(Mpa@23° C.) [ASTM D638] |
|---|---|---|
| comparison | 0 | 80 |
| 1 | 25 | 165 |
| 2 | 30 | 186 |
| 3 | 33 | 196 |
| 4 | 35 | 200 |
| 5 | 50 | 245 |

It is verified through the above table 5 that tensile strength of the body when the body is formed by mixing the PA66 with the glass fiber is very greater than that of a body formed of only the PA66. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 50 weight percent.

In still another embodiment, the body may be formed by mixing a POK with a glass fiber. Preferably, the glass fiber has a weight percent higher than 0 weight percent and less than 40 weight percent, and the POK has a weight percent higher than 60 weight percent. Experimental result is shown in following table 6.

TABLE 6

| embodiment | glass fiber weight percent | Tensile strength(Mpa@23° C.) [ASTM D638] |
|---|---|---|
| comparison | 0 | 60 |
| 1 | 15 | 100 |
| 2 | 20 | 125 |
| 3 | 30 | 140 |
| 4 | 40 | 165 |

It is verified through the above table 6 that tensile strength of the body when the body is formed by mixing the POK with the glass fiber is very greater than that of a body formed with only the POK. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 40 weight percent.

Components in the embodiments described above can be easily understood from the perspective of processes. That is, each component can also be understood as an individual process. Likewise, processes in the embodiments described above can be easily understood from the perspective of components.

The embodiments of the disclosure described above are disclosed only for illustrative purposes. A person having ordinary skill in the art would be able to make various modifications, alterations, and additions without departing from the spirit and scope of the disclosure, but it is to be appreciated that such modifications, alterations, and additions are encompassed by the scope of claims set forth below.

The invention claimed is:

1. A casing of a pump comprising:
   a metal member configured to have at least two sub metal members;
   a body; and
   a liner,
   wherein the sub metal members are included in the body, the body is formed of plastic, the sub metal members surround the liner, a fluid flow space through which fluid flows is formed in the liner,
   wherein the liner includes a liner body member, a liner flange member and a liner connection member for connecting the liner body member to the liner flange member,
   wherein at least one of the sub metal members includes a sub metal body member, a sub metal flange member and a sub metal connection member for connecting the sub metal body member to the sub metal flange member,
   wherein the body includes a body member, a body flange member and a body connection member for connecting the body member to the body flange member, and
   wherein a width of the sub metal flange member is higher than a width of the liner flange member, and the sub metal flange member surrounds the liner connection member while the sub metal flange member is beneath the liner flange member.

2. The casing of claim 1, wherein the liner flange member, the sub metal flange member and the body flange member form one flange, and the one flange is combined with a flange of a piping.

3. The casing of claim 1, wherein at least one first hole into which a fixing member is inserted and at least one second hole in which melted plastic is filled during an insert molding is formed on the sub metal flange member.

4. The casing of claim 1, wherein the sub metal members surround the liner, the sub metal flange member has a shape of torus cut by half, and a groove curve line of the sub metal flange member covers a part of the liner body member.

5. The casing of claim 1, further comprising:
a supporting member,
wherein the supporting member includes a metal supporting member longitudinally extended from one of the sub metal members and a plastic supporting member for covering the metal supporting member,
the metal supporting member is formed together with corresponding sub metal member, and the plastic supporting member is formed on the metal supporting member through an insert molding.

6. A casing of a pump comprising:
a metal member; and
a body formed of plastic,
wherein at least one hole in which melted plastic is filled is formed on the metal member, and the metal member is included in the body through an insert molding,
at least one another hole through which a fixing member is inserted is further formed on the metal member, and
the fixing member is inserted into a hole formed on a flange member of a piping, a hole formed on a flange of the body and the one another hole of the metal member.

7. The casing of claim 6, further comprising:
a liner disposed in the metal member,
wherein the metal member includes two sub metal members,
one of the sub metal members surrounds a part of the liner, and other sub metal member surrounds other part of the body.

8. A method of manufacturing a casing of a pump, the method comprising:
surrounding an integral liner with sub metal members; and
inserting a structure where the sub metal members surround the liner in melted plastic, so that the sub metal members are included in a body formed of plastic,
wherein each of the sub metal members includes a sub metal body member, a sub metal flange member and a sub metal connection member for connecting the sub metal body member to the sub metal flange member, and
wherein at least one hole in which the melt plastic is filled is formed on each of the sub metal flange members.

* * * * *